United States Patent [19]
Salisbury

[11] 3,893,274
[45] July 8, 1975

[54] MASONRY FASTENER

[76] Inventor: Jeffery J. Salisbury, 328 Kensington Pl., Syracuse, N.Y. 13210

[22] Filed: Sept. 9, 1974

[21] Appl. No.: 504,312

[52] U.S. Cl.................. 52/300; 24/221 R; 52/698; 52/713; 85/1 K; 85/1 H
[51] Int. Cl................................................ E04b 2/00
[58] Field of Search ............ 52/713, 709, 710, 300, 52/293, 698, 367; 85/1 K, 1 H, 7, 9; 24/221 R; 248/59

[56] References Cited
UNITED STATES PATENTS

| | | | |
|---|---|---|---|
| 753,969 | 3/1904 | Fee ....................................... | 248/59 |
| 1,055,242 | 3/1913 | Wagner............................ | 52/713 X |
| 1,131,399 | 3/1915 | McGinley............................ | 85/9 R |
| 1,205,883 | 11/1916 | Gay....................................... | 85/1 K |
| 1,306,100 | 6/1919 | Chadwick ............................ | 85/1 H |
| 1,661,868 | 3/1928 | Armstrong et al................... | 85/1 K |
| 2,120,530 | 6/1938 | Shippee et al. ....................... | 85/1 K |
| 2,855,776 | 10/1958 | Trostle............................. | 52/300 X |

FOREIGN PATENTS OR APPLICATIONS
488,075  5/1970  Switzerland........................... 52/713

*Primary Examiner*—Alfred C. Perham
*Attorney, Agent, or Firm*—Bruns & Jenney

[57] ABSTRACT

A fastener for securing longitudinally extending wall members to a vertically apertured masonry block wall has a bolt with one end threaded for engagement with a nut for securing the wall member to the bolt. The other end of the bolt is flattened on diametrically opposite surfaces to a thickness less than the bolts central section and thereby extending the other two sides radially of the bolt. An anchor plate for the bolt adapted to lie in the mortar layer between courses of the wall, has a central hole of the same shape as the flattened bolt end. The flattened end has a plurality of longitudinally spaced and circularly extending grooves so that the bolt can be turned when a groove is aligned with the plate. Protuberances on the plate adjacent the hole provide a frictional engagement between bolt and plate and then a positive stop when the bolt is turned clockwise 90°. Each plate has a U-shaped slot with straight sides adapted to engage the flattened end of a bolt like a wrench.

6 Claims, 8 Drawing Figures

3,893,274

MASONRY FASTENER

BACKGROUND OF THE INVENTION

This invention relates to anchoring means for walls of concrete or masonry blocks having vertical apertures therethrough and is particularly concerned with a bolt and cooperating means for anchoring the bolt at selected intervals along the wall whereby a sill or other longitudinally extending wall member may be secured to the wall.

Heretofore such masonry fasteners have required holes to be drilled through the blocks, have required complicated expansion devices for anchoring to the wall, or have comprised complicated many-armed structures welded together and precisely dimensioned for the particular wall blocks used and for installation during the course of constructing the wall.

SUMMARY OF THE INVENTION

The fastener of the invention contemplates the use of the vertical passages which are commonly present in walls built of cement blocks and other masonry blocks. A bolt is provided adapted to extend through the passage through at least one course or block. The upper end of the bolt is threaded so that it can secure a longitudinally extending wall member, such as a sill, to the wall by means of a nut.

The other end of the bolt is adapted to be secured to an anchor plate which is thin enough to be installed in a mortar layer of the wall while the mortar is wet. The end to be secured to the plate is flattened on opposite sides so as to decrease the thickness of the bolt between the diametrically opposite flat sides and also to extend portions of the bolt at this flattened end in a direction parallel to the flat sides so that rounded portions project outward beyond an unflattened round portion at the center of the bolt.

A plurality of circularly extending and longitudinally spaced grooves are then formed in the flattened end of the bolt. The width of each groove is equal to the thickness of the anchor plate and the circular bottom of each groove is equal to the thickness of the bolt between the flattened sides.

The anchor plate has, at its center, an oblong-oval hole therethrough conforming to the outer shape of the bolt flattened end so that this end can be inserted through the hole. The bolt is then moved endwise to bring a selected one of the grooves into alignment with the anchor plate and the bolt is then turned 90° to lock the bolt to the plate.

Adjacent its central hole, the plate is deformed to provide a frictional drag or binding between the plate and the engaged bolt groove when the bolt is turned about 45° and a protuberance is formed on the plate to provide a positive stop when the bolt is turned 90° so that, once the bolt is turned 90° it cannot be turned farther by tightening a nut on the threaded end of the bolt and so that the bolt cannot be accidentally separated from the plate during construction of the wall.

Each plate is provided with a U- shaped slot in at least one edge conforming to a portion of the outer shape of the bolt flattened end, the slot having straight sides which can be engaged as a wrench with a bolt for turning it. While the bolt is being engaged with an anchor plate, another plate may be used to turn the bolt.

DESCRIPTION OF THE PREFERRED EMBODIMENT

Figure 2:
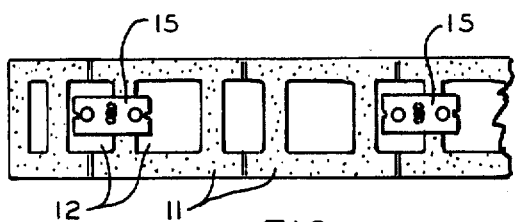
FIG. 2 is a sectional view on the line 2—2 of FIG. 1.
Figure 1:
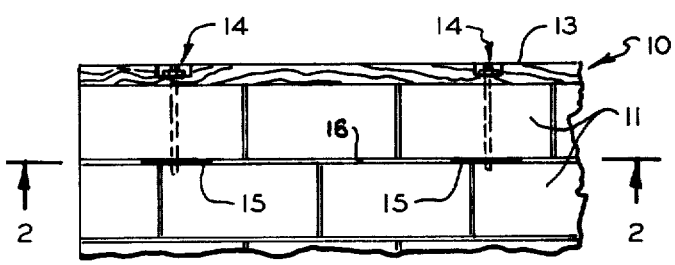
FIG. 1 is a fragmentary side elevational view of the top portion of a cement block wall with a wooden sill secured thereto by devices according to the invention.

Referring to FIGS. 1 and 2, a wall 10 constructed of a known type of cement masonry blocks 11 having vertically extending apertures 12 therethrough has a wooden sill 13 secured to the top thereof by a plurality of devices 14, each having a rectangular anchor plate 15 placed in the mortar layer 16 between rows of blocks, the mortar layer being indicated by horizontal spaced lines in FIG. 1 and the plates being indicated by blacking the space between the lines.

Figure 7:
FIG. 7 is a side elevational view thereof.
Figure 6:
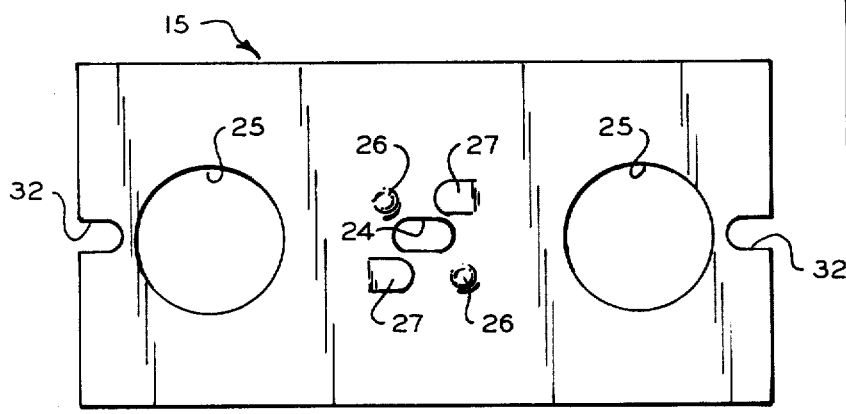
FIG. 6 is a plan view on a reduced scale of an anchor plate portion of the devices shown in FIG. 1.
Figure 8:
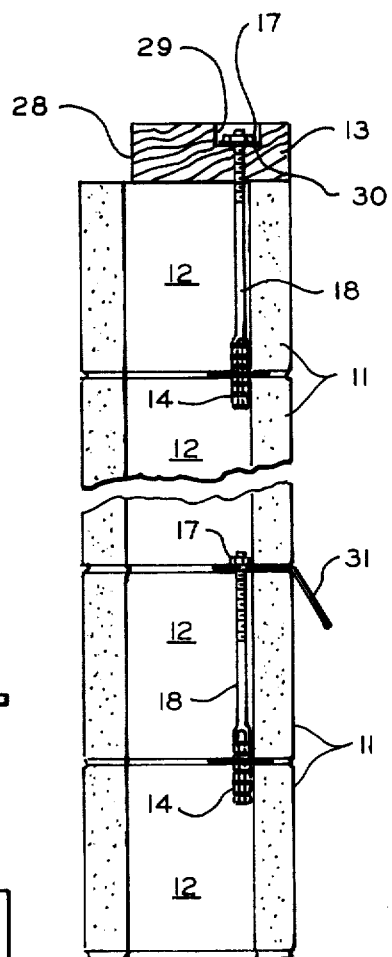
FIG. 8 is a fragmentary, transverse sectional view of a wall on a reduced scale showing a wooden sill and a flashing strip each secured thereto by a device shown in FIG. 1.
Figure 5:
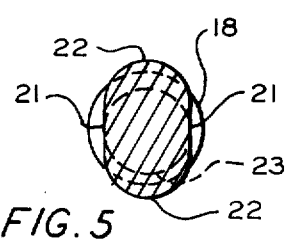
FIG. 5 is a further enlarged sectional view on the line 5—5 of FIG. 4.
Figure 3:
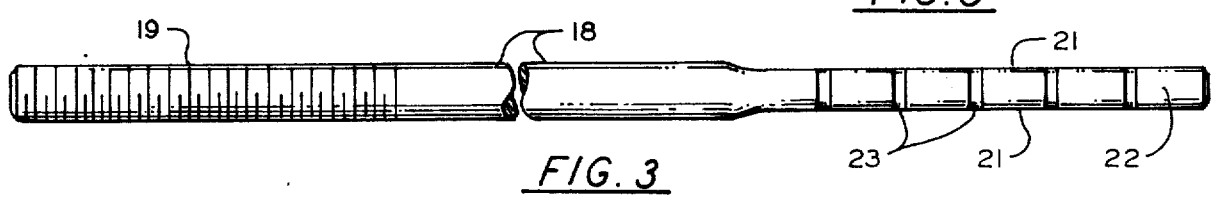
FIG. 3 is an enlarged, fragmentary, side-elevational view of a bolt portion of the devices shown in FIG. 1.
Figure 4:
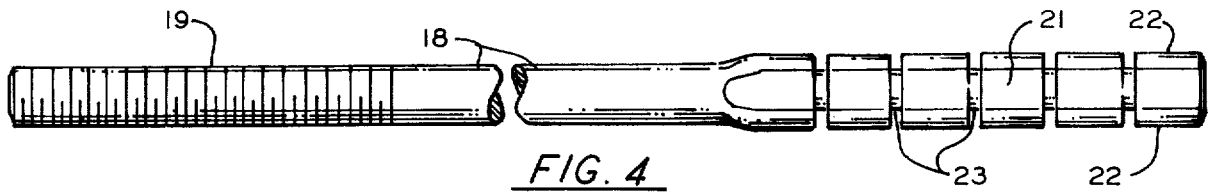
FIG. 4 is a fragmentary side-elevational view thereof with the bolt rotated 90°.

Referring to FIGS. 3–8 inclusive, each device 14 comprises a nut 17, best seen in FIG. 8, a bolt 18, shown in FIGS. 3, 4 and 5, and a plate 15, shown in FIGS. 6 and 7.

The bolt 18 is fashioned from a round rod, the length of the portion at its center being of a length chosen according to the size of masonry block used. One end 19 of the bolt is threaded for engagement with the nut 17 therealong and the other end 20 is flattened to provide diametrically opposite flat sides 21 and to expand the other two sides 22 radially outward to project beyond the rounded configuration of bolt 18 at its center, as best seen in FIG. 5. The surface at the end of each of the projecting sides 22 is arcuate.

A plurality of longitudinally-spaced, circularly extending grooves 23 are formed around the flattened end, as shown. The width of each groove 23 is equal to the thickness of plate 15 and the circular bottom of each groove is of a diameter equal to the thickness of the bolt between the flat surfaces 21.

Plate 15, shown on a smaller scale in FIGS. 6 and 7 than are FIGS. 3 and 4, has a hole 24 at its center of an oblong-oval configuration conforming to the shape of the flattened end 21–22 of bolt 18 between grooves.

Two holes 25 are provided on either side of hole 24 for the free flow of wet mortar therethrough when the plate is first placed in the wet mortar layer between courses of blocks 11.

Around the central hole 24 the plate 15 is deformed by four protuberances 26—26 and 27—27 struck upwards from the surface shown in FIG. 6, the proturbances being centered in pairs substantially on lines at 45° from the centerline of hole 24 in each direction, as shown.

It will be apparent that the bolt 18 may be lowered, flattened end down, through any of the apertures 12 in the blocks until approximately the desired length of threaded end 19 of the bolt extends above the block 11, the flattened end 21-22 passing through the hole 24 in the plate. A slight adjustment of the bolt, up or down, will then align one of the grooves 23 with the plate 15 and the bolt may then be turned.

A diametrically opposite pair of protuberances 26—26 are round and dimple like and are the first encountered by the flattened end 21-22 of the bolt when it is turned clockwise, with respect to the threaded end 19, as it would be when a nut 17 was tightened thereon. The dimples 26 are not themselves contacted by the expanded and rounded projecting sides 22 but deformation of the plate produces a raised portion of the plate around the dimples which is encountered by the sides of the groove 23 aligned with the plate and a frictional resistance to turning results. However, the bolt 18 can be turned past this resistance.

The other diagonally opposite pair of protuberances 27—27 are tongue-like in shape but not separated from the adjacent portion of the plate. The highest portion of a protuberance 27 is placed so as to form a positive stop to the turning of the bolt clockwise, as shown.

As the bolt is turned clockwise, a frictional resistance is therefore encountered and then the turning bolt meets a positive stop and can turn no farther than this substantially 90° turn.

When a wooden 2 inch × 6 inch sill 28 is secured to the top of a wall by devices 14, for example, a countersunk hole 29 is provided for each device 14 and the nut 17, and the usual accompanying washer 30, lie in the countersunk hole 29, as shown at the top of FIG. 8. When a flashing strip 31 is secured to a wall, as shown at the bottom of FIG. 8, the threaded end 19 of the bolt passes through an appropriate hole in the strip and is likewise secured in place by a nut 17.

It will be apparent that other longitudinally extending wall members, such as wall caps or copings or metal insect shields may be secured in place by devices 14.

It will be apparent that, as nut 17 is tightened the bolt 18 itself is prevented from turning by the protuberances 27—27. The frictional protuberances 26 prevent the bolt 18 from being accidentally turned counterclockwise.

The flattened end 21-22, being an oblong oval, may be turned by a wrench past the protuberances 26. As a convenience, a slot 32 is provided in each end of plate 15. Slot 32 is in the shape of the two flat sides 21 connected by the arcuate slot end of the same shape as the bolt side surface 22. When a bolt 18 is ready to be turned with respect to its plate 15, another plate 15 may be used as a wrench so that such a wrench is always available.

It will be apparent that the devices 14 may be used with other masonry blocks having different dimensions and with bricks having vertically extending apertures. Such smaller blocks and bricks usually have their apertures so placed as to form vertically extending apertures when used in a masonry wall. For the smaller blocks the bolts 18 may be adapted to pass through several courses rather than the single course here shown.

I claim:

1. In combination, a nut, a bolt and a plate for securing to a vertically apertured masonry block wall an associated wall-member extending longitudinally of the wall; the bolt having a first end substantially circular in cross section and threaded for threaded engagement therealong with the nut; the other end of the bolt being deformed to an oblong-oval cross-sectional configuration having arcuate ends connected by diametrically opposite flattened sides, the thickness between the flat sides being less than the diameter of the first end and having a distance between the rounded ends exceeding the diameter of the first end; the bolt other end having a plurality of longitudinally-spaced, circularly-extending grooves therearound, the inner diameter of the grooves being substantially equal to the thickness between the flat sides, the grooves having a width substantially equal to the plate thickness; the plate thickness being less than the mortar layer thickness selected for the wall, the plate having a hole therethrough conforming to the cross-sectional shape of the bolt other end; whereby the bolt other end is inserted through the plate hole, the plate aligned with a selected one of the circularly extending grooves, the bolt then being rotated 90° to lock the plate and bolt, the plate lying in the mortar layer, the bolt extending through a wall vertical aperture and through a hole in the longitudinally extending wall-member for securing the member to the wall by the nut.

2. The combination nut, bolt and plate defined in claim 1, wherein the plate is deformed adjacent its hole on diametrically opposite sides of the hole for forming a positive stop against which the radially projecting rounded ends of the bolt other end abut when the bolt is rotated 90° after being inserted in the plate hole, whereby the bolt is prevented from turning with respect to the plate when the nut is tightened on the bolt first end.

3. The combination nut, bolt and plate defined in claim 2, wherein the plate has at least one dimple-like deformation substantially tangent to the path of the rounded ends of the bolt other end when the bolt is turned toward the positive stop deformations, whereby the plate is frictionally engaged by the sides of the slots in the bolt other end when it is turned with respect to the plate to prevent accidental dislodgement of the bolt from the plate.

4. The combination nut, bolt and plate defined in claim 1, wherein the plate is rectangular and has a slot in at least one end conforming in shape to the two flat sides and one rounded end of the bolt other end, whereby a second plate is usable as a wrench in turning the bolt other end with respect to an engaged first plate.

5. An anchor bolt device for masonry walls of building blocks having vertically extending apertures therethrough for securing to the wall longitudinally extending associated wall members, the device comprising: a nut, a bolt, and a rectangular plate of a thickness less than the thickness of the mortar layers of the wall; the bolt having a first end substantially circular in cross section and threaded for engagement therealong with the nut; the bolt other end being deformed to form flat surfaces on diametrically opposite sides and to extend the other opposite sides projecting beyond the circular surface of the first end, the thickness between the flat sides being less than the diameter of the first end and the projecting sides having arcuately curved surfaces; the bolt other end having a plurality of longitudinally-spaced circularly-extending grooves therearound, the inner diameter of the grooves being substantially equal to the thickness between the flat sides, the grooves having a width substantially equal to the plate thickness;

the plate having a hole therethrough conforming to the cross-sectional shape of the bolt other end and being deformed adjacent the hole for forming a positive stop against which a projecting rounded side of the bolt other end abuts when the bolt is inserted in the plate hole with a selected one of the grooves aligned with the plate and the bolt is then turned 90°, the plate having also a dimple-like deformation adjacent its hole substantially tangent to the path of one of the rounded projecting sides of bolt other end when the bolt is turned toward the positive stop deformation; whereby the plate is embedded in a selected mortar layer when building the wall, the bolt is placed threaded end up extending through a block aperture with its other end through the plate hole with a selected groove aligned with the plate and then turned 90° thereby locking the bolt to the plate with its threaded end extending up above the block and adapted to pass through a hole through the associated wall member for securing the associated member to the wall by the nut.

6. The anchor bolt device defined in claim 5 wherein the plate has a slot in at least one end conforming in shape to the two flat sides and one projecting rounded side of the bolt other end, whereby a second plate is usable as a wrench in turning the bolt other end with respect to an engaged first plate.

* * * * *